United States Patent [19]
Brown

[11] Patent Number: 5,087,533
[45] Date of Patent: Feb. 11, 1992

[54] CONTACT POTENTIAL DIFFERENCE CELLE

[76] Inventor: Paul M. Brown, 10492 Summerwind, Boise, Id. 83704

[21] Appl. No.: 638,222

[22] Filed: Jan. 7, 1991

Related U.S. Application Data

[63] Continuation-in-part of Ser. No. 420,294, Oct. 12, 1989, abandoned.

[51] Int. Cl.$^5$ .............................................. H01M 14/00
[52] U.S. Cl. ...................................................... 429/5
[58] Field of Search ........................ 429/5, 10; 136/253

[56] References Cited

U.S. PATENT DOCUMENTS

| | | | |
|---|---|---|---|
| 1,182,513 | 5/1916 | Thofehrn | 429/5 |
| 1,217,739 | 2/1917 | Flannery | 429/5 |
| 2,900,535 | 8/1959 | Thomas | 429/5 |
| 3,019,358 | 1/1962 | Ohmart | 429/5 |
| 3,255,044 | 6/1966 | Power et al. | 429/5 |

Primary Examiner—Anthony Skapars
Attorney, Agent, or Firm—Schroeder, Davis & Orliss Inc.

[57] ABSTRACT

An electrical energy generating device which utilizes the potential difference between two dissimilar materials having different work functions and the ionizing properties of radioactive decay products is provided. A current generating cell includes a pair of electrodes of electro-chemically dissimilar materials separated by a space filled with a solid medium having a relatively high dielectric constant and a relatively low ionization constant. A current flows in an external circuit coupling the two electrodes together when the solid medium is ionized. Utilizing a suitable radioactive material mixed or dispersed in the solid medium provides an internal ionizing flux. Similarly, a current is generated in the external circuit when each of the electrodes are constructed of two plates of dissimilar materials in physical contact with each other and the medium is ionized.

13 Claims, 4 Drawing Sheets

CONTACT POTENTIAL DIFFERENCE CELLE

CROSS REFERENCE TO RELATED APPLICATION

This application is a continuation-in-part of co-pending application Ser. No. 07/420,294 filed on Oct. 12, 1989, now abandoned.

BACKGROUND OF THE INVENTION

The present invention relates generally to electrical power generation and storage and more specifically to self contained autogenous electrical power sources.

It is well-known in the art of electrical power generation and storage to construct a battery of alternating plates of dissimilar materials immersed in an electrolyte, such battery being charged by the impression of an electrical current thereon and, in use, being discharged by the passage of current through an external load. Such prior art batteries may be constructed of many different plate materials and utilize different electrolytes. The most common are the lead-acid storage battery utilized in the automobile industry, for example, to store power for starting the engine and the nickel-cadmium battery commonly utilized in small appliances.

U.S. Pat. No. 4,119,766 entitled "Energy Cell Device" issued Oct. 10, 1978 to Gerard A. Doering discloses a galvanic cell for converting chemical energy to electrical energy by process known in the art. Doering teaches that the current obtainable from a galvanic cell can be increased in proportion to the surface area of the plate materials and he discloses a method of utilizing woven materials in a cylindrical configuration to achieve increased current. The device disclosed by Doering relies on conventional chemical reactions and provides for no extension of battery life or unusual power source other than by varying the thickness of the plates to provide more material to be consumed.

U.S. Pat. No. 4,169,917 entitled "Electrochemical Cell and Separator Plate Thereof" issued Oct. 2, 1979 to Bernard S. Baker and Dilip J. Dharia discloses a fuel cell device for converting an external source of fuel into electrical energy by chemical conversion. Baker and Dharia teach that the efficiency of a fuel cell may be enhanced by manipulation of the flow path by which the fuel passes through the device and disclose methods by which such manipulation can occur. The device functions as an engine converting fuel to electrical energy, relying on the size of the external fuel supply to determine useful cell life.

U.S. Pat. No. 4,366,216 entitled "Electrical Energy Storage" issued Dec. 28, 1982 to John E. McGinness discloses a method of storing electrical energy within the matrix of an organic solid by manipulation of the electrical ions within the matrix. This device overcomes the limitations of chemical reaction based systems then known in the art but fails to address extension of the useful lifetime without recharging limitation common to all batteries.

Each of the above cited U.S. patents disclose storage batteries which utilize chemical reactions for storing and releasing electrical energy. In this process some or all of the battery components are consumed or destroyed and, in the case of rechargeable batteries, require an external power source to be recharged.

It is well-known in the field of nuclear physics that many materials, such as metals and many compounds of metals, have a measurable tendency to release electrons. This tendency is related to the amount of work or energy, referred to as the work function, require to overcome the force holding an electron on the surface of a material. The work function is specific to each material and, typically, increases with material density. It is possible to arrange materials in a rank order by the numerical value of their work function. If two dissimilar materials are placed in contact with each other or if the two dissimilar materials are coupled together in an electric circuit, the material with the lower work function will release electrons to the material with the greater work function until the two materials are electrically balanced or in equilibrium. The resulting difference in potential between the two materials is equal to the difference in their work functions and is referred to as the contact potential difference of the two materials.

U.S. Pat. No. 2,696,564 entitled "Radio Electric Generator" issued Dec. 7, 1954 to Philip E. Ohmart discloses a device to detect external sources of radiation by direct conversion of such radiation to an electrical current. Ohmart describes a detector cell comprising a center electrode and a concentric outer electrode enclosing a volume of ionizable gas therebetween. The electrodes are fabricated from electro-chemically dissimilar materials and are connected in an external circuit. Ionization of the gas by externally produced radiation produces a current flow, the magnitude of which is proportional to the radiating flux. The center electrode may be hollow forming a sample holder for receiving a radioactive source. The detector cell disclosed by Ohmart provides improvement over prior art radiation detectors in that it eliminates this need for an external voltage supply. However, an external source of radioactive flux is required to generate electric current.

SUMMARY OF THE INVENTION

An electrical energy source constructed according to the principles of the present invention utilizes the principle that when two dissimilar materials having different work functions are placed in physical contact, a potential difference equal to the difference in their work functions will exist between the two materials. Similarly, a parallel plate capacitor having plates of dissimilar materials and shorted in an external circuit will have a potential difference across the gap between the plates. No current will flow in the external circuit between the plates because the Fermi levels of the constituent elements are equalized by an initial flow of electrons which balances their electronic structure. If the gap between the plates contains a self-ionizing gas, such as a radioactive gas, current will flow in the external circuit due to the transfer of electrons by the ionized gas from one plate to the other. Similarly, a non-radioactive gas produces the same result if it is irradiated by an ionizing flux.

The present invention uniquely combines the formation by a radioactive flux of ions in an ionizable gas with the storage capacity of dissimilar metals to provide a battery having a useful life measured in years without the need for recharging. A cell constructed according to the principles of the present invention is essentially a constant voltage generator with an internal impedance determined by the materials of construction. The battery of the present invention converts the energy of radioactive decay products directly to electrical energy and provides an available lifetime for power generation that is a function of the radioactive half-life of the materials utilized for the electrodes or ionizing gas.

DETAILED DESCRIPTION OF THE PREFERRED EMBODIMENT

Figure 1:
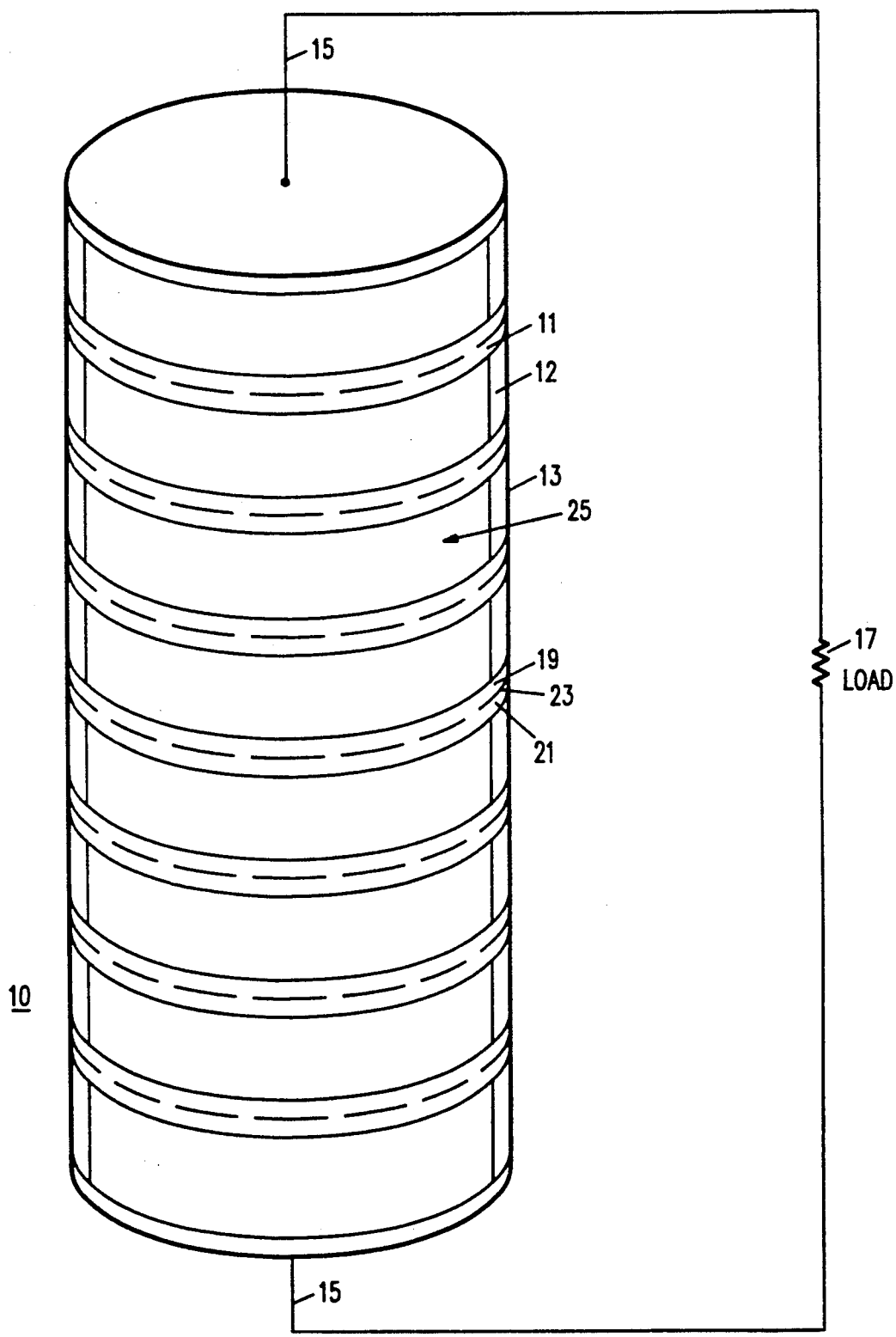
FIG. 1 is a perspective cut away view of a battery constructed according to the principles of the present invention.

Referring now to FIG. 1, a battery 10 comprising a series of contact potential difference cells constructed in accordance with the principles of the present invention is shown. The battery 10 comprises a number of electrodes 11 mounted in a suitable case 13 separated by a space 25 and provided with terminals 15 to connect the battery 10 to a load 17. The electrodes 11 are separated by insulator blocks 12. Each electrode 11 is constructed of two plates 19, 21 of dissimilar materials having different work functions which are in physical contact at surface 23. The work function of a first plate (referred to as $\phi_1$) plate 19, is taken to be greater than the function of a second plate (referred to as $\phi_2$), plate 21. The work functions of selected elements and compounds are listed in Table I. Assuming that both plates 19, 21 are at the same temperature, electrons will migrate across the contact surface 23 from the material having the lower work function, plate 21 in this example, to the material having the greater work function, plate 19. Thus the average energy level of the electrons in the material comprising plate 19 will be lowered and, similarly, the average energy level of the electrons in the material comprising plate 21 will be raised. This migration of electrons across the contact surface 23 will continue until the average energy levels of the two materials, plates 19 and 21, are equalized and in equilibrium. Since electrons have migrated to plate 19, the material having the greatest work function, plate 19 will have a net negative charge. Similarly, the material having the least work function will have a net positive charge. The resulting potential difference between the two plates is equal to the difference in their work functions, i.e., the contact potential difference ($V_{CPD}$), is given by $$V_{CPD} = V_1 - V_2 = \phi_1 - \phi_2.$$

The polarity of $V_{CPD}$ is determined by the material having the greatest work function.

TABLE I

| Cs | 2.14 | As | 3.75 | Fe | 4.5 |
|---|---|---|---|---|---|
| Rb | 2.16 | Tl | 3.84 | Sb | 4.55 |
| K | 2.30 | Hf | 3.9 | W | 4.55 |
| Eu | 2.5 | Zr | 4.05 | Mo | 4.6 |
| Sr | 2.59 | Mn | 4.1 | Cu | 4.65 |
| Ba | 2.7 | In | 4.12 | Ru | 4.71 |

TABLE I-continued

| Sm | 2.7 | Ga | 4.2 | Os | 4.83 |
|---|---|---|---|---|---|
| Na | 2.75 | Bi | 4.22 | Si | 4.85 |
| Ca | 2.87 | Cd | 4.22 | Te | 4.95 |
| Ce | 2.9 | Pb | 4.25 | Re | 4.96 |
| Li | 2.9 | Ta | 4.25 | Be | 4.98 |
| Tb | 3.0 | Ag | 4.26 | Rh | 4.98 |
| Gd | 3.1 | Al | 4.28 | C | 5.0 |
| Y | 3.1 | Nb | 4.3 | Co | 5.0 |
| Nd | 3.2 | V | 4.3 | Ge | 5.0 |
| Lu | 3.3 | Ti | 4.33 | Au | 5.1 |
| Th | 3.4 | Zn | 4.33 | Pd | 5.12 |
| La | 3.5 | Sn | 4.42 | Ni | 5.15 |
| Sc | 3.5 | B | 4.45 | Ir | 5.27 |
| U | 3.63 | Hg | 4.49 | Pt | 5.65 |
| Mg | 3.66 | Cr | 4.5 | Se | 5.9 |

| Absorbed Film Emitters | | | |
|---|---|---|---|
| Tungsten-cesuim | 1.5 | Molybendum-thorium | 2.6 |
| Tungsten-barium | 1.6 | Tantalum-thorium | 2.5 |
| Tungsten-cerium | 2.7 | | |

| Thin Oxide Films | | | |
|---|---|---|---|
| BaO on W | 1.2 | SrO on W | 1.3 |

| Rare Earth Oxides | | | | | |
|---|---|---|---|---|---|
| $La_2O_3$ 3.18 | $Nd_2O_3$ 2.96 | $Sm_2O_3$ 2.98 | $Gd_2O_3$ 3.0 | | |

The space 25 between the electrodes 11 is filled with an ionizable gas which, when ionized, provides a conducting medium between the electrodes 11. The positive and negative ions in the ionized migrate to the negatively and positively charged plates, respectively, thereby providing a current flow when an external circuit through load 17 is connected. The gas can be ionized by any suitable well-known method. Ion recombination in the gas does occur so that electrode 11 separation must be selected at an optimum width to maximize ion formation and minimize ion recombination. Conductivity of the ionizable gas may be increased by the addition of no more than two percent by volume mercury vapor. Ion separation and recombination reduction can be enhanced by the imposition of a magnetic field with the magnetic flux perpendicular to the electrode 11 surfaces.

In the preferred embodiment, the gas is ionized by irradiation with a radiative flux. The source of the radioactive flux may be external, such as encountered in or near a nuclear reactor, or may be internal to the battery 10. If the gas utilized in space 25 is a radioactive gas, such as a radioactive isotope of radon, then it will be self-ionizing. Similarly, if the material of one or both plates 19, 21 comprising the electrodes 11 is radioactive, the decay products will serve as the ionizing flux.

Figure 2:
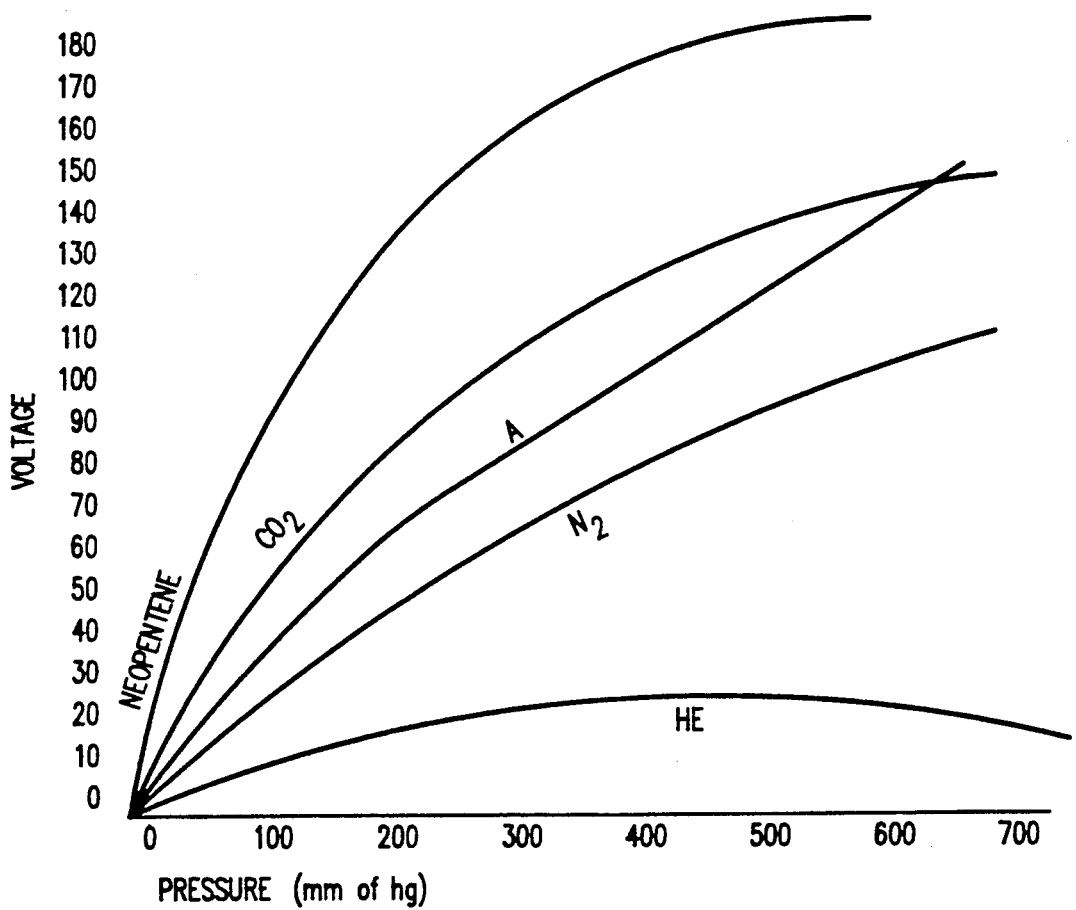
FIG. 2 is a graph illustrating the battery cell voltage as a function of gas pressure.

The magnitude of the current produced is directly proportional to the pressure of the gas in space 25 and to the ionization efficiency of the radiating flux. FIG. 2 is a graph illustrating the relationship between the voltage developed across a load and the pressure of selected gases which are suitable for use in battery 19. Since the ionizing efficiency of charged particles is much greater in a gaseous medium than that of gamma flux, radioactive material utilized for electrodes 11 is preferably an alpha or beta producer, i.e., decays with the emission of an alpha or beta particle. Similarly, in general, the current increases with increased flux density and as the molecular weight of the filling gas increases. Ionization of the filling gas by a gamma flux is due primarily to secondary irradiation resulting from gamma absorption by the electrode 11 and structural materials. Therefore, if a gamma flux is utilized as an ionization flux, consideration has to be given to the gamma absorption properties of the electrode and structural materials.

When a radioactive gas is utilized as the filling gas, radioactive isotopes of the heavier, noble gases such as radon are preferably. Radioisotopes of radon decay by alpha emission and, typically, exhibit relatively low ionization potentials. Compound gases such as sulphur hexaflouride and uranium hexaflouride, while having high molecular weights and low ionization potentials, tend to break down under heavy beta flux and recombination is a greater problem than encountered with the noble gases.

While the magnitude of the current produced by battery 10 is a function of many variables, the voltage developed is typically a function primarily of the dissimilar materials utilized for the electrodes 11. Examples of different electrode material combination and the voltages produced are illustrated in Tables II and III.

TABLE II

Using $Al_2O_3$ Negative Electrode

| Positive Electrode | Open Circuit Voltage |
|---|---|
| $PbO_2$ plated on gold | 1.34 |
| Oxidized copper | 0.975 |
| Gold plated on copper | 0.95 |
| Silver | 0.67 |
| Copper | 0.64 |
| Brass | 0.64 |
| Lead | 0.2 |
| Chromium | 0.18 |
| Zinc | 0.01 |

TABLE III

Using Carbon Negative Electrode

| Positive Electrode | Open Circuit Voltage |
|---|---|
| Zinc | 1.089 |
| Lead | .879 |
| Iron | .497 |
| Copper | .351 |

Figure 3:
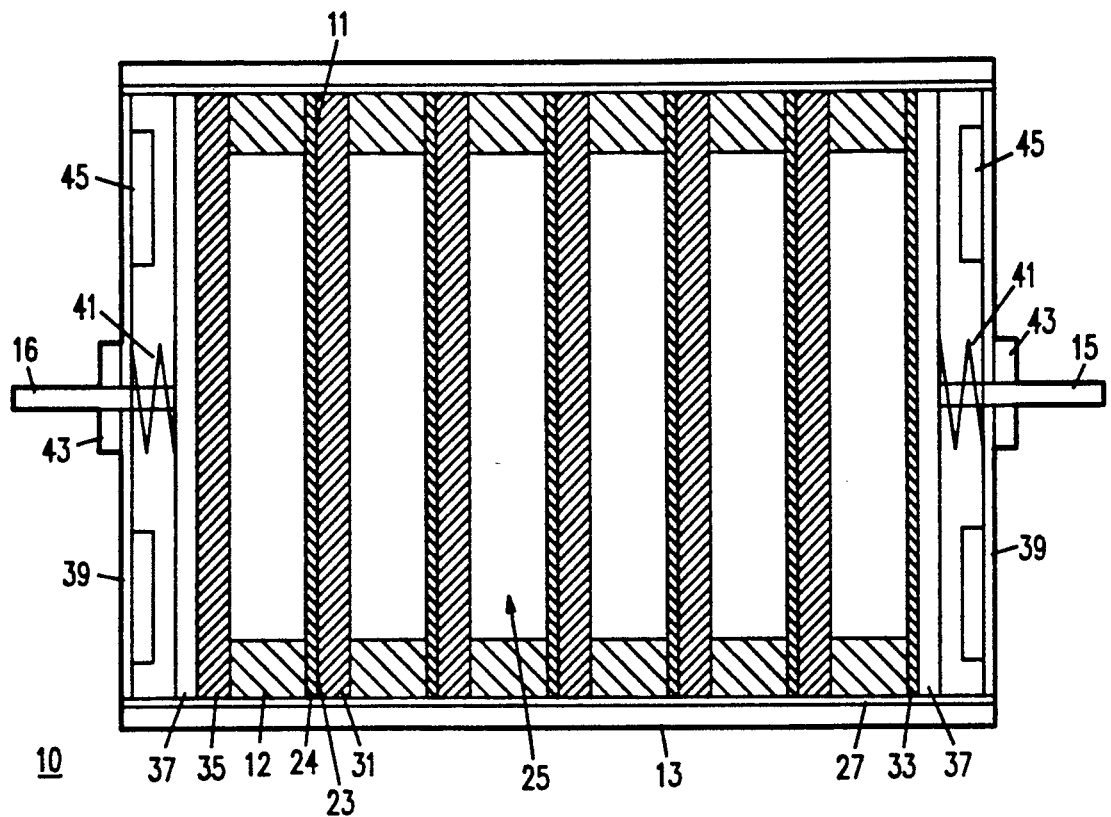
FIG. 3 is a cross-sectional view of the battery shown in FIG. 1.

Referring now to FIG. 3, a battery 10 is constructed of electrodes 11 separated by insulator blocks 12. Each electrode 11 comprises a plate 29 of radioactive thallium-204 in physical contact at interfacing surface 23 with a plate 31 of nickel. The space 25 between the electrodes 11 is filled with an ionizable gas, such as argon. The thallium-204 decays by beta emission emitting a 0.7 million electron volt (Mev) beta particle which serves as the irradiating flux to ionize the gas in space 25 separating the electrodes 11. End electrodes 33, 35 each comprise a plate of material which is dissimilar with respect to the opposing plate of the adjacent electrode 11. Thus, end electrode 33 comprises a plate 33 of thallium-204 and end electrode 35 comprises a plate 33 of thallium-204 and end electrode 35 comprises a plate 35 of nickel. The end electrodes 33, 35 are welded or otherwise suitably attached to tungsten end plates 37 to which terminals 15 and 16, respectively, are attached.

The battery 10 is assembled by stacking the components in an annular insulating tube or vessel and filling the battery with argon gas to a pressure of approximately 70 pounds per square inch. The insulating tube 27 is enclosed in a suitable outer case which conforms to the Nuclear Regulatory Commission requirements for containment of radioactive materials and provides sufficient strength and integrity to contain the pressurized gas. Each electrode 11 comprises a thin sheet of thallium-204 foil having a thickness in the range of 0.5 to 0.75 millimeters (mm) thick adjacent a plate of nickel having a thickness of 2.0 to 3.0 mm. The electrodes 11 are separated by annular rings 12 of a porous insulating material having a thickness of 5.0 to 10.0 mm (sintered polyvinylchloride or extruded polyethylene is suitable for this purpose). The electrodes 11 and end electrodes 33 and 35 are arranged such that a nickel plate 31 always opposes a thallium-204 plate 29 across gap 25.

The insulating vessel 12 may be a glass tube having a 50 mm inside diameter enclosed in a tubular stainless steel case 13 closed by end pieces 39. Springs 41 are placed about insulated terminals 15 and 16 between the tungsten end plates 37 and the case end pieces 39 to provide sufficient force to maintain contact between the thallium plates 29 and the nickel plates 31 and keep the battery assembly together. The case end pieces 39 are retained in place by well-known methods. For example, terminals 15 and 16 can comprise threaded bolts having nuts 43 tightened thereon to retain the case end pieces 39 in place and seal the case 13.

Figure 4:
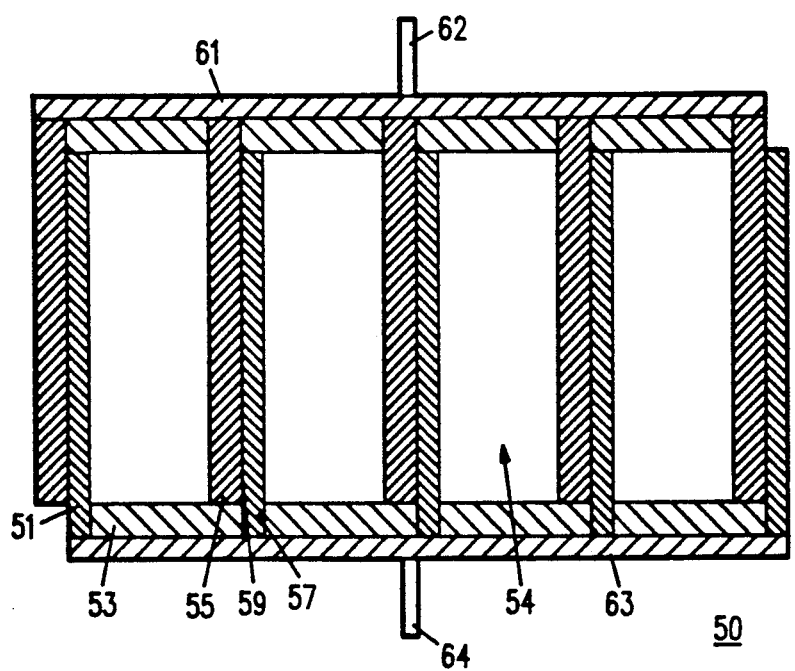
FIG. 4 is a cross-sectioned view of another preferred embodiment of a battery constructed in accordance with the principles of the present invention.

Each battery cell formed by a pair of electrodes 11 separated by gap 25 will provide a current proportional to the beta flux density at approximately 1.3 volts. While FIG. 3 illustrates a series arrangement of cells, any combination of series or parallel cells (as shown in FIG. 4) can be arranged in a battery 10 to produce the desired current and voltage. The efficiency of the battery may be increased by raising the pressure of the filling gas. The conductivity of the ionized gas may be also increased by addition of a small amount of mercury vapor. A small amount of bismuth may be placed adjacent one of the tungsten end plates 37 to act as a getter in the battery. Neodymium annular permanent magnets 45 may be attached to the inside surface of the case end pieces 39 to provide a magnetic field normal to the electrode 11 surfaces to promote ion separation and minimize the ion recombination rate.

Referring now to FIG. 4, a battery 50 constructed in accordance with the principles of the present invention having a number of battery cells electrically connected in parallel is shown. A number of electrodes 51 are separated by insulating spacers 53 and the space 54 separating the electrodes 51 is filled with an ionizable gas. Each electrode 51 comprises two plates 55 and 57 of dissimilar materials having different work functions in physical contact at interface surface 59. At one edge of electrode 51, one plate, plate 55 for example, extends past the edge of the other plate, plate 57 for example. At the opposite edge of the electrode 51, the other plate, plate 57, extends past the edge of the one plate, plate 55. All of the extending plates 55 at the edge of the electrodes 51 are attached to and electrically connected by terminal plate 61. Similarly, all of the extending plates 57 at the opposite edge of the electrodes 51 are attached to and electrically connected by terminal plate 63. Terminal 62 and 64 are provided at terminal plates 61 and 63, respectively, to facilitate connecting the battery 50 in an electric circuit (not shown).

The efficiency of the contact potential difference cell shown in FIGS. 1, 3 and 4 is limited as a function of the leakage current (back current) through the gaseous medium between the electrodes. To reduce the leakage current requires a medium having a high dielectric constant. In order to also provide for desired forward current flow through the medium requires a low ionization potential. Solid semiconductor materials such as silicon, barium titanate and gallium arsenide are examples of dielectric materials having both a relatively high dielectric constant and a relatively low ionization potential. Utilizing well-known methods, such as sputter deposition, such semiconductor materials may be mixed with a radioactive substance, such as tritium ($H^3$), krypton ($Kr^{85}$) or plutonium ($Pu^{238}$), to form a self-ionizing dielectric medium.

Figure 5:
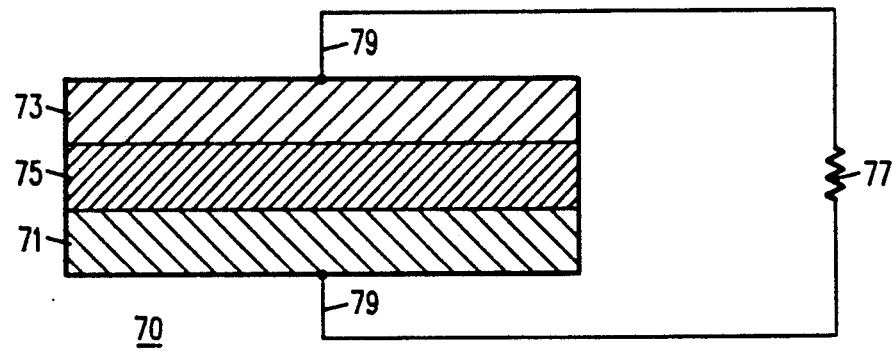
FIG. 5 is a cross-sectional view of a battery cell constructed in accordance with the principles of another preferred embodiment of the present invention.
Figure 6:
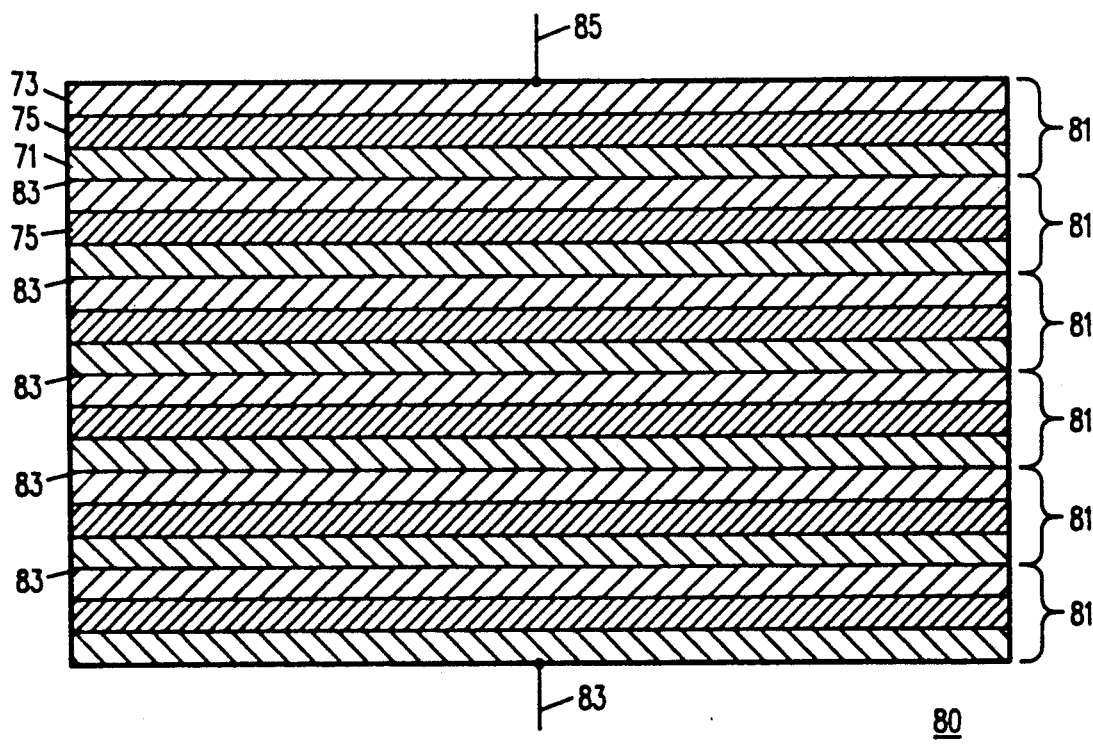
FIG. 6 is a cross-section view of a battery constructed in accordance with the preferred embodiment shown in FIG. 5.

Referring now to FIGS. 5 and 6, a contact potential difference cell 70, referred to as an "isotope electric cell" (IEC), is constructed in accordance with the principles of the present invention utilizing first and second plates 71, 73, respectively, having different work functions and separated by a solid dielectric medium 75.

The first plate 71, for example, is formed from a metal having a low work function as shown in Table I, such as cesium (Cs), barium (Ba) or magnesium (Mg). The second plate 73, for example, is of a metal having a high work function as shown in Table I, such as nickel (Ni), platinum (Pt) or selenium (Se). The dielectric medium 75 comprises a mixture of a semiconductor material such as silicon (Si), and a radioactive material such as $Kr^{85}$, $H^3$ or $Pu^{238}$. In one preferred embodiment, the first and second plates 71, 73 and the dielectric medium 75 comprise thin films formed by a well-known sputter deposition process. For example, utilizing a thin Ni foil as both a substrate and the high work function plate, second plate 73 for example, a thin layer of Si and a suitable isotope such as $Kr^{85}$ are simultaneously sputter-deposited onto the Ni substrate and, finally, a thin layer of a low work function metal such as a Mg is sputter-deposited onto the Si isotope layer forming the first plate 71 thus forming a thin foil isotope electric cell with the radioactive isotope dielectric medium sealed within the foil between the first and second plates. The end result is a single cell, isotope electric cell in foil form having a voltage determined by the difference in work functions of the two metal plates 71, 73 and the current capacity determined by the amount and type of radioactive isotope utilized, the type of semiconductor material utilized for the dielectric medium 75 and the surface area of the metal foil plates. Additionally, the foil may in turn be sealed in epoxy, polystyrene or other suitable substance.

A single cell IEC battery 70 may be constructed (as shown in FIG. 5) having a terminal means 79 connected to each plate 71, 73 for coupling the battery 70 to a load 77 and completing the electrical circuit. Similarly, as discussed herein above with reference to FIGS. 1, 3 and 4, a multi-cell battery 80 (as shown in FIG. 6) may be constructed by stacking in series a number of single IEC cells 81 with the low work function plate 71 of one IEC cell in contact with the high work function plate 73 of the adjacent IEC cell. Electrons will migrate across the contact surface 83 between the dissimilar plates 73, 73 from the material having the lower work function, plate 71 for example, to the material having the higher work function; plate 73 for example. This migration of electrons across the contact surface 83 will continue until the average energy levels of the two materials, plates 71 and 73, are equalized and in equilibrium. The material having the greatest or high work function, plate 73, will have a net negative charge while the material having the lower work function, plate 71, will have a positive charge. Battery terminals 83 and 85 connected to the positive and negative end plates 73,71, respectively, provide electrical connection to a load (not shown).

The dielectric medium may be either a homogeneous mixture of the semiconductor and radioactive isotope materials, or may be a heterogeneous medium. For example, in one preferred embodiment utilizing a suitable substrate which may be easily removed, a 0.0005 inch layer of Ma is sputter-deposited on the substrate, then a 0.00025 inch layer of a homogeneous mixture of Si and $H^3$ is deposited over the Mg layer and finally a 0.0001 inch layer of Ni is deposited over the Si—$H^3$ layer to form a single cell IEC foil 0.00085 inch thick. In another preferred embodiment, a 0.0005 inch layer of Mg is sputter-deposited on a copper substrate followed by a 0.0005 inch layer of Si. A 0.00025 inch layer of homogeneous Si and $H^3$ is deposited over the Si layer, and finally a 0.0001 inch layer of Ni is sputter-deposited over the Si—$H^3$ layer.

Utilizing sputter-deposition techniques, radioactive isotopes of heavier gases, such as krypton and xenon, may be deposited simultaneously with a pure metal such as iron, aluminum or nickel to form a homogeneous mixture containing the gas atomically dispersed throughout the metal matrix. In another preferred embodiment then, Ni is sputter-deposited simultaneously with $Kr^{85}$ to produce a 6 percent homogeneous layer 0.004 inch to form the high work function plate and then a 0.001 inch layer of Si is sputtered over the Ni—$Kr^{85}$ layer to form the dielectric medium. A suitable material for the low work function plate is then sputter-deposited over the Si to form the IEC.

The one cell thick foil produced as described above may be rolled into tubes or spirals to form a single cell battery as shown in FIG. 5 for relatively low voltage, high current applications. Alternatively, the foil thus produced may be cut or punched into pieces having any desired size and/or shape. For example, disks may be formed and stacked in series to produce a multi-cell battery providing a greater voltage as shown in FIG. 6. For example, the battery 80 may be formed of (6) six cells 81, each cell 81 consisting of a 0.003 inch layer of Mg, first plate 71, and a 0.004 inch layer of Ni, second plate 73, separated by a 0.0005 inch Si isotope dielectric medium. Each cell develops a voltage of approximately 1.5 volts. Battery 80 thus provides a voltage of approximately 9 volts, and has an overall thickness of 0.045 inches. The current capacity of the battery 80 is determined primarily by the dissimilar materials utilized for the plates 71,73 and by the contact surface area 83 of the plates, i.e., the diameter of the foil disks.

While the present invention has been particularly shown and described with respect to certain preferred embodiments thereof, it should be readily apparent to those of ordinary skill in the art that various changes and modifications in form and details may be made without departing from the spirit and scope of the invention as set forth in the appended claims.

I claim:

1. An apparatus for generating electrical energy comprising:
   first and second spaced electrodes, said first and second electrodes of dissimilar materials having different work functions; and
   a solid dielectric medium disposed between said first and second electrodes, said solid dielectric medium comprising a radioactive material and a solid dielectric material, said radioactive material providing an ionizing flux for ionizing said dielectric medium.

2. Apparatus as in claim 1 wherein said dielectric material comprises a semiconductor material.

3. Apparatus in claim 2 wherein said radioactive material is homogeneously dispersed in said semiconductor material.

4. Apparatus as in claim 1 wherein said solid dielectric medium comprises a material having a relatively high dielectric constant and a relatively low ionization potential.

5. Apparatus as in claim 3 wherein said solid dielectric medium is fabricated by simultaneous sputter deposition of said semiconductor material and said radioactive material.

6. Apparatus as in claim 2 wherein said semiconductor material comprises silicon.

7. An apparatus for generating an electric current comprising:
- a plurality of spaced elements, each element comprising first and second plates of dissimilar materials having different work functions, said first and second plates in physical contact with each other, said plurality of spaced elements arranged such that said first and second plates alternate; and
- a solid dielectric medium disposed in the space separating said elements, said solid dielectric medium comprising a radioactive material and a dielectric material, said radioactive material providing an ionizing flux for ionizing said dielectric material.

8. Apparatus as in claim 7 wherein said radioactive material decays by beta particle emission.

9. Apparatus as in claim 8 wherein said solid dielectric medium comprises a radioactive material homogeneously dispersed in a semiconductor material.

10. Apparatus as in claim 9 wherein said semiconductor material comprises silicon.

11. An electrical energy device comprising:
- a plurality of spaced electrodes, each electrode comprising first and second plates of dissimilar materials having different work functions, said first and second plates in physical contact with each other, said plurality of spaced electrodes arranged in series fashion such that said first and second plates alternate, at least one of said first and second plates being fabricated from a metal having a radioactive gas homogeneously dispersed therein;
- a solid dielectric medium disposed within the space separating adjacent ones of said spaced electrodes, said dispersed radioactive gas providing an ionizing flux for ionizing said solid dielectric medium.

12. An electrical energy device as in claim 11 wherein said radioactive gas comprises krypton.

13. An electrical energy device as in claim 12 wherein said solid dielectric medium comprises a semiconductor material.

* * * * *